J. E. LEA.
METER OR MEASURING INSTRUMENT.
APPLICATION FILED MAR. 28, 1908.

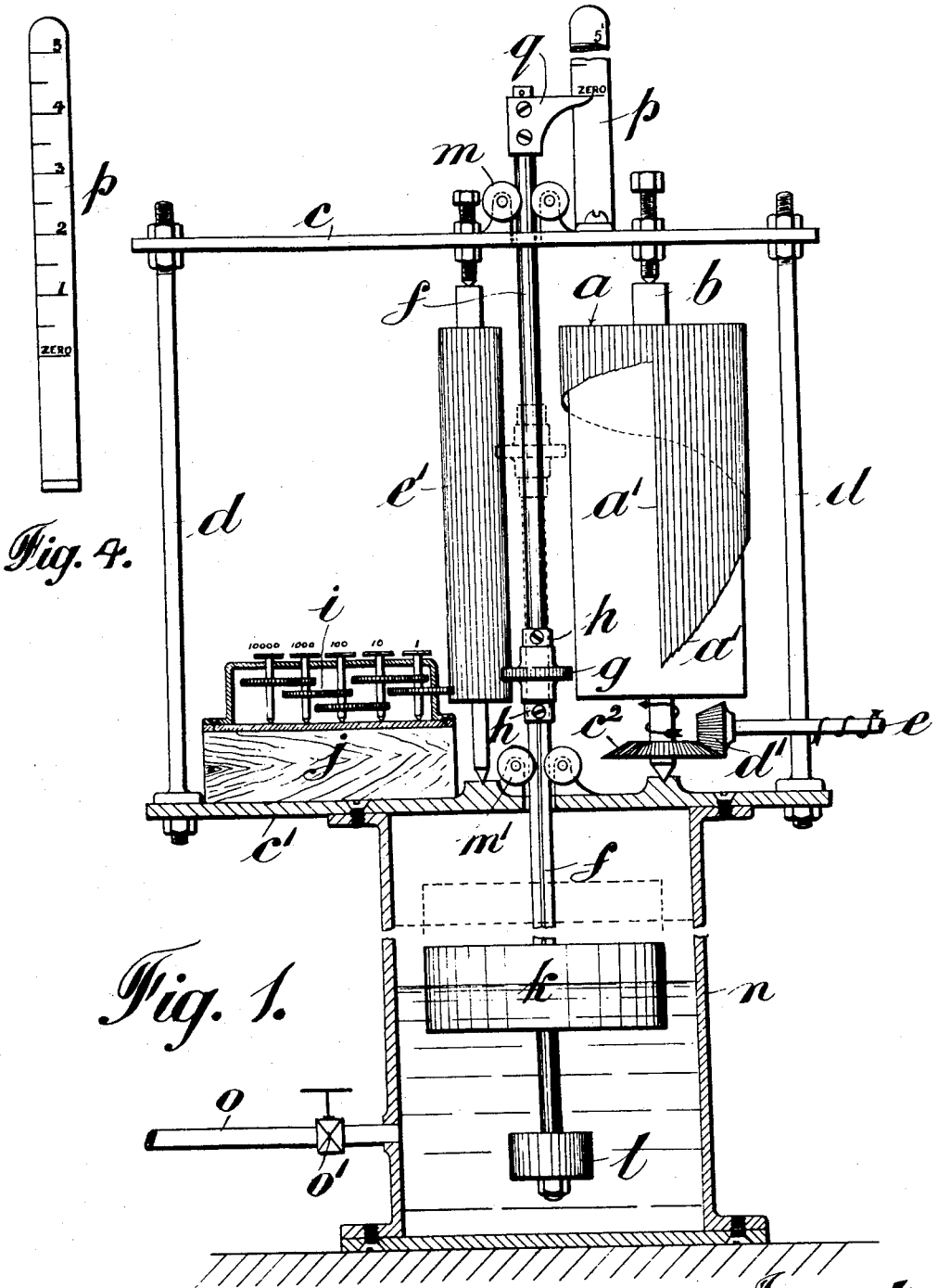

1,112,459.

Patented Oct. 6, 1914.
2 SHEETS—SHEET 2.

Witnesses:
P. W. Bailey.
F. J. Meredith.

Inventor.
James E. Lea.
By his Attorney:- Walker Dunn

UNITED STATES PATENT OFFICE.

JAMES EDWARD LEA, OF MANCHESTER, ENGLAND.

METER OR MEASURING INSTRUMENT.

1,112,459.  Specification of Letters Patent.  Patented Oct. 6, 1914.

Application filed March 28, 1908. Serial No. 423,894.

*To all whom it may concern:*

Be it known that I, JAMES EDWARD LEA, a subject of the King of Great Britain and Ireland, and resident of Manchester, England, have invented an Improved Meter or Measuring Instrument, of which the following is a specification.

This invention relates to the measurement of liquids, and refers to that type of measuring instrument in which a rotary drum is employed, which, in conjunction with a certain formation of its surface and a small roller and lever, brings about the intermittent rotation of a pinion, which, in turn, operates counting mechanism, the rotations of the pinion being proportional to the "rates of flow" of the liquid to be measured, *i. e.* the quantity of liquid flowing for a given height of the liquid in a given time.

The object of this invention is to dispense with the said roller and lever arrangement, and generally to simplify the construction of the instrument.

Figure 3:
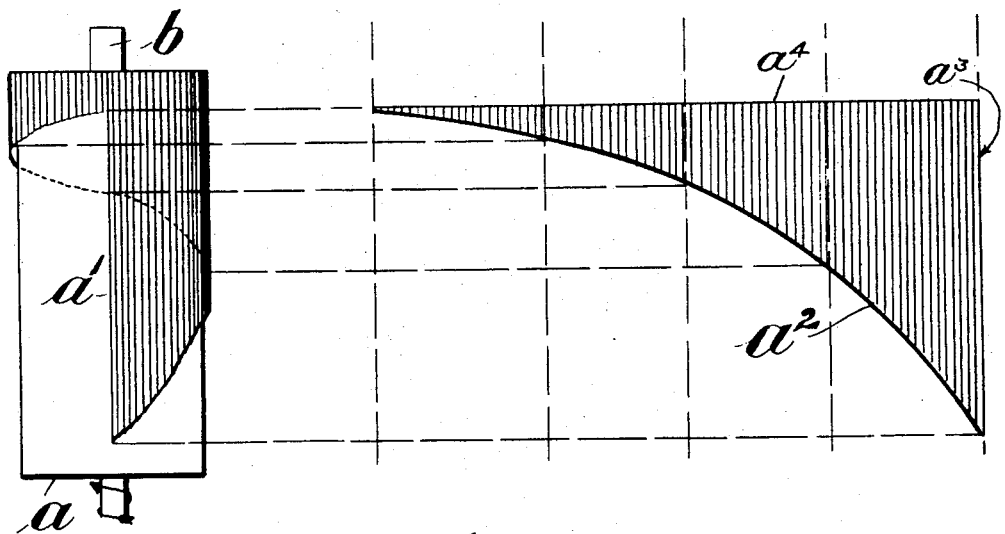
Figure 2:
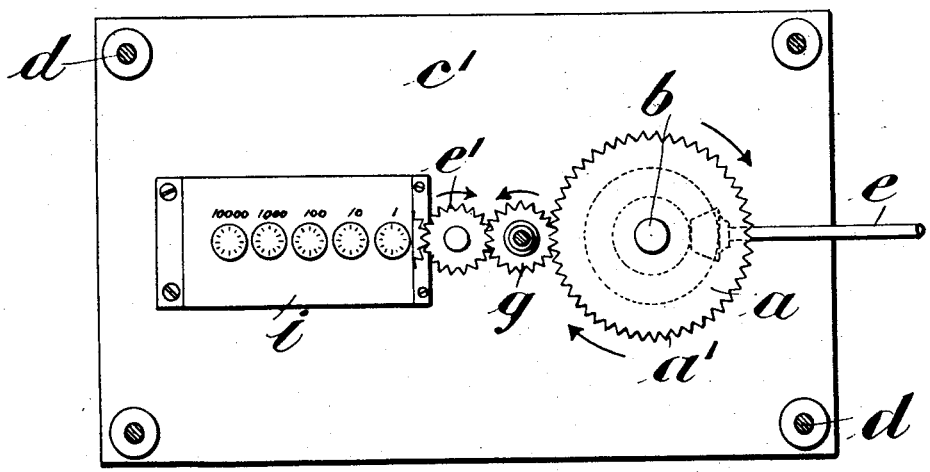

Upon the accompanying drawings, Figure 1 illustrates a side elevation of an instrument constructed according to the invention. Fig. 2 illustrates a plan of the instrument with the top plate removed. Fig. 3 illustrates a development of a part of the instrument hereinafter referred to. Fig. 4 illustrates a detached view of a scale that may be used with the instrument.

According to the invention, use is made of a metal drum $a$ which is mounted in a vertical position and designed to rotate, its axis $b$ being mounted between the two plates $c$, $c'$ by means of fixed and adjustable centers as shown. The said plates $c$, $c'$, together with rods $d$, constitute the frame of the instrument. Upon the surface of the drum $a$ is a number of small elongated teeth $a'$, which lie parallel to each other and to the drum, and which are of even size and pitch transversely but longitudinally differ in length. Such varying lengths are determined in the manner hereinafter described. Upon the drum axis $b$ is fixed a bevel wheel $c^2$ and meshing with such wheel is a small bevel pinion $d'$ carried by a spindle $e$ of a strong clock or other suitable motor (not shown) which will rotate the wheels and the drum at a uniform rate. Also mounted adjustably in centers between the plates $c$, $c'$ is a long pinion $e'$ which in length equals the drum $a$.

Passing through holes in the plates $c$, $c'$ and arranged, by preference, at a point directly between the drum $a$ and the pinion $e'$ is a long spindle or shaft $f$. Loosely mounted upon such spindle or shaft between adjustable collars $h$ is a pinion wheel $g$ the teeth of which constantly mesh with the teeth of the long pinion $e'$. The teeth on the drum $a$, pinion $e'$ and pinion wheel $g$ are all of equal pitch. Meshing with the pinion $e'$ is the first or units wheel of an ordinary revolution counter $i$, this latter being mounted horizontally upon a block $j$ and fitted with a dial plate marked with degrees of measurement and the axes of the wheels carrying pointers for each of the dials. The spindle $f$ at its lower end extends below the plate $c'$, and near its lower end is fitted with a float $k$, and (if desired) with a balance weight $l$.

At points immediately above the plates $c$, $c'$ are guide rollers $m$, $m'$ and the lower rollers $m'$ are preferably formed with V-grooves in order to fit the spindle $f$, which at its lower end, between the float and pinion wheel, is of square cross-section, and thus prevents the spindle turning around, while allowing it to move freely up or down.

In the case of the measurement of a liquid discharged from a tank either over a weir or through an orifice the action of the instrument is as follows:—The float is placed in a chamber such as $n$, see Fig. 1, connected by a pipe $o$ with the tank. This chamber is always preferred in order that the action of the float shall be steady and that it may be controlled by a valve. As the level of the water rises or falls the float rises or falls and thereby imparts a movement to the spindle $f$ in a vertical direction. In thus moving up or down the spindle raises or lowers the pinion wheel $g$ to various positions in relation to the long pinion $e'$ and the drum $a$. Prior to use the drum will be set in motion by the motor, being rotated at a uniform speed, say at one revolution per minute. With the drum rotating and with its teeth $a'$ formed as aforesaid it will impart a rotary motion to the pinion wheel $g$ varying in amount with the height of such wheel, and such variations being proportional to the rates of flow of the liquid it will cause the counter to be rotated to an extent corresponding to the amount of water that has passed in any given time.

In the measurement of a liquid the rate of flow in relation to the movement of any object, such as a float or valve, acted upon by the liquid or gas, may be represented by a curve obtained by setting out a diagram with ordinates and abscissæ, in which the ordinates represent the movements of the float and the abscissæ the rates of flow corresponding to such float movements. Such a curve is used in setting out the length of the teeth on the drum $a$, see Fig. 3, which is a development or diagram of the teeth $a'$ in the flat, and the edge $a^2$ represents the said curve, which may be called the "curve of flow". The teeth on the drum are of such lengths and in such numbers as to cover the drum to an extent equal to the area inclosed between the curve $a^2$ of the diagram, the line $a^3$ representing the vertical axis of such diagram, and the line $a^4$ (drawn parallel to the horizontal axis of the diagram) which represents the maximum rate of flow, the circumference of the drum being made equal to this last mentioned line. The formation of the curve will vary according as the rates of flow of the liquid and the movements of the float are directly proportional to each other or otherwise. The drum $a$ will rotate preferably in the direction of the arrow. When the plain parts are opposite the pinion wheel $g$ the latter will not be rotated although it is free to move up and down, the long pinion $e'$ allowing of the movement. As the number of teeth upon the drum at any height measured from the bottom of the drum is proportional to the rate of flow corresponding to the rise of the float from zero to such height the revolutions of the counter during one minute are at all times proportional to the rate of flow and thus the total number of units passed is counted. The length of the longest teeth $a'$ will be, by preference, slightly less than the length of the drum so that when the float is at zero, and no water is passing, the drum $a$ may rotate without rotating the wheel $g$. The teeth will entirely encircle the top of the drum so that when the maximum flow is reached the pinion wheel will rotate continuously.

Upon the plate $c$ may be a fixed vertical indicator $p$, see Fig. 4, and upon the spindle $f$ a pointer $q$ which moving over the indicator will give an indication of the height of the water in the tank or the rate of flow at any moment. The valve $o'$ in pipe $o$ serves to throttle the pipe and prevent the too sudden movement of the float.

The teeth on the drum and pinions will preferably be small, and such as to readily mesh with each other, with the rise of the pinion. In this connection provision may be made for insuring the correct meshing of the teeth at all times, although any momentary obstruction will have little or no effect on the accuracy of the total measurement and may be neglected. The curve represented by the edge of the area covered by the teeth on the drum is varied to suit the ratio between the rate of flow of the liquid to be measured and the movement of the object operated by the said liquid.

What I claim is:—

In a meter or instrument for measuring the flow of a liquid, a rotary drum having upon its periphery a number of teeth said teeth being of varying length, in combination with a long rotary pinion, a spindle slidably mounted between the said pinion and the drum, a float to which the spindle is connected and which is acted upon by the liquid to be measured, a small rotary pinion wheel on the said spindle, a revolution counter comprising a train of gear wheels, the said small pinion being in constant driving connection with the long pinion and the said long pinion being in constant driving connection with the counter, and the said teeth on the drum being adapted to engage the pinion wheel and to rotate such pinion wheel to an extent varying with the varying positions of the float, substantially as herein set forth.

In witness whereof I have hereunto set my hand in the presence of two witnesses.

JAMES EDWARD LEA.

Witnesses:
F. C. PENNINGTON,
F. J. MEREDITH.